United States Patent [19]

Fukushima et al.

[11] Patent Number: 4,680,629
[45] Date of Patent: Jul. 14, 1987

[54] DISPLAY UNIT

[75] Inventors: Nobuo Fukushima, Nagasaki; Shuji Iwata, Hyogo, both of Japan

[73] Assignee: Mitsubishi Denki Kabushiki Kaisha, Tokyo, Japan

[21] Appl. No.: 706,412

[22] Filed: Feb. 27, 1985

[30] Foreign Application Priority Data

Feb. 28, 1984 [JP] Japan .................................. 59-38313

[51] Int. Cl.⁴ ......................... H04N 7/087; H04N 7/08
[52] U.S. Cl. .................... 358/147; 358/142; 358/146
[58] Field of Search ............... 358/142, 909, 147, 146, 358/242, 181, 183

[56] References Cited

U.S. PATENT DOCUMENTS

| 3,749,831 | 7/1973 | Simpkins | 358/147 |
|---|---|---|---|
| 4,148,074 | 4/1979 | Stakhov | 358/242 |
| 4,288,809 | 9/1981 | Yabe | 358/147 |
| 4,388,639 | 6/1983 | Cox et al. | 358/147 |
| 4,388,645 | 6/1983 | Cox et al. | 358/142 |

FOREIGN PATENT DOCUMENTS 8203290  9/1986  United Kingdom ................ 358/147

OTHER PUBLICATIONS

The TIFAX XM11 Teletext Decoder; by Bryan Norris & Garry Garrard, pp. 1-19.

Primary Examiner—James J. Groody
Assistant Examiner—Michael D. Parker
Attorney, Agent, or Firm—Sughrue, Mion, Zinn, Macpeak & Seas

[57] ABSTRACT

A display unit capable of simultaneously displaying motion pictures, still pictures and character data received in a multiplexed form on a single input terminal. A decoder distributes the motion picture data directly to a motion picture data memory without modification, while a processing device receives the still picture and character data from the decoder and processes it before applying it to a still picture and character data memory. The outputs of the two memories are ORed together, then applied to drive a cathode-ray tube.

1 Claim, 2 Drawing Figures

DISPLAY UNIT

BACKGROUND OF THE INVENTION

The present invention relates to a display unit for receiving and displaying multiplexed motion pictures (television signals), still pictures and digital signals.

Examples of a display unit of this kind include a video text system and a teletext system. FIG. 1 shows an example of the video text system. In FIG. 1, reference numeral 1 designates an ordinary television set; 2, an antenna for receiving broadcast waves; 3, a tuner; 4, a switch; 5, a CRT (cathode-ray tube) drive circuit; 6, a CRT; 7, an adapter connected to a telephone line; and 8, the telephone line.

As is well known in the art, with the video text system, still pictures and characters can be displayed on the television set according to codes, patterns and command data transmitted over the telephone line 8. However, with the video text system, it is impossible for the television set to display data transmitted over the telephone line when it is being used for receiving and displaying ordinary television broadcast signals. Accordingly, in order to display motion pictures, still pictures and character data at the same time, it is necessary to provide two television sets.

SUMMARY OF THE INVENTION

An object of the invention is to eliminate the above-described drawbacks accompanying a conventional display unit.

In accordance with this object, the invention provides a display unit which is provided with means for inputting and processing multiplexed signals to display motion pictures, still pictures and character data simultaneously.

DESCRIPTION OF THE PREFERRED EMBODIMENTS

Figure 1:
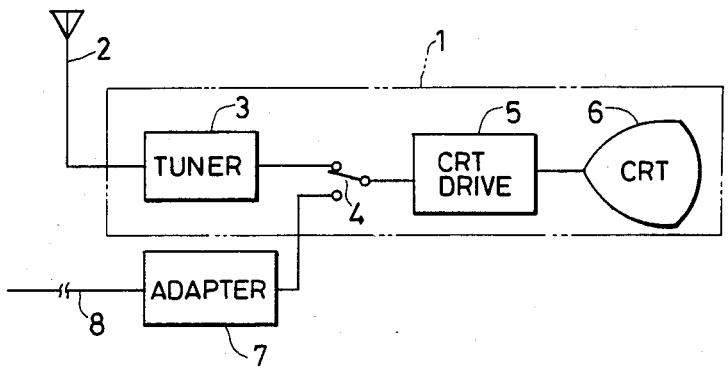
FIG. 1 is a block diagram showing a conventional video text system.
Figure 2:
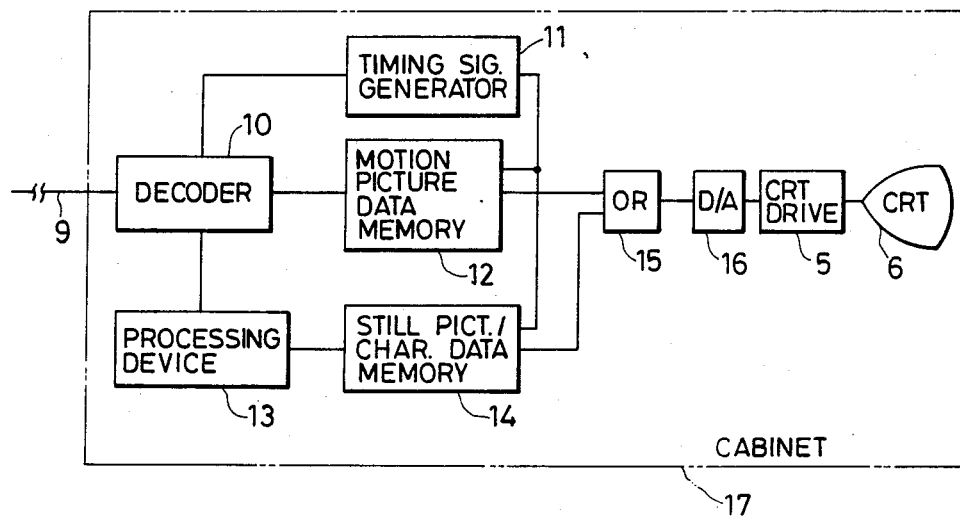
FIG. 2 is a block diagram showing a preferred embodiment of the invention.

A preferred embodiment of the invention will be described with reference to FIG. 2. In FIG. 2, reference numeral 9 designates a transmission line for transmitting a signal including motion picture, still picture and character data and command data in a multiplex mode; 10, a decoder; 11, a timing signal generating device; 12, a motion picture data memory device; 13, a processing device for processing the still picture and character data according to the command data; 14, a still picture and character data memory device; 15, an OR gate; 16, a D/A (digital-to-analog) converter; 5, a CRT drive circuit; 6, a CRT; and 17, a cabinet accommodating the above-described components 5, 6 and 10 through 16.

The operation of the circuit in FIG. 2 will be described. A signal including motion picture, still picture and character data and command data in a multiplex mode is applied through the transmission line 9 to the decoder 10. As a result, the motion picture data is written into the motion picture data memory device 12 without modification. The motion picture data is refreshed at a rate of 50 or 60 fields per second as necessary. On the other hand, the still picture and character data is processed according to the command data in the processing device 13 and then written into the still picture and character data memory device 14. The data stored in the memory devices 12 and 14 is read out according to a timing signal produced by the timing signal generating device 11 and applied to the OR gate 15. The output of the OR gate 15 is subjected to digital-to-analog conversion by the D/A converter 16 so that the drive circuit 5 causes the CRT 6 to display the motion picture, still picture and character data simultaneously.

In the above-described embodiment, still picture and character data are stored in the same memory device; however, they may be stored in two memory devices with the same effects as in the above-described embodiment.

As is apparent from the above description, according to the invention, signals including motion picture, still picture and character data and command data in multiplex mode are decoded and processed in the display unit, and the motion picture data memory device and the still picture and character data memory device are accommodated in one cabinet. Therefore, three kinds of pictures can be displayed on one CRT at the same time.

We claim:

1. A display unit comprising: a decoder receiving on an output terminal a signal containing motion picture, still picture and character data and command data in a multiplex mode; a motion picture data memory, said decoder applying said motion picture data directly to an input of said motion picture data memory; a still picture and character data memory; a processing device receiving still picture and character data from said decoder for processing said still picture and character data and applying said still picture and character data to said still picture and character data memory; timing means, responsive to an output of said decoder, for controlling read-out of contents of said motion picture data memory and said still picture and character data memory; an OR gate receiving on first and second inputs thereof outputs of said motion picture data memory and said still picture and character data memory, respectively in accordance with operation of said timing means; a digital-to-analog converter receiving on an input thereof an output of said OR gate; a CRT drive circuit receiving on an input thereof an output of said digital-to-analog converter; and a CRT driven by said CRT drive device.

* * * * *